(12) United States Patent
Ousley

(10) Patent No.: US 11,217,119 B2
(45) Date of Patent: Jan. 4, 2022

(54) INSTRUCTIONAL DERMATOLOGY SURFACE MODELS AND METHODS OF USE

(71) Applicant: East Tennessee State University Research Foundation, Johnson City, TN (US)

(72) Inventor: Lisa E. Ousley, Johnson City, TN (US)

(73) Assignee: EAST TENNESSEE STATE UNIVERSITY RESEARCH FOUNDATION, Johnson City, TN (US)

( * ) Notice: Subject to any disclaimer, the term of this patent is extended or adjusted under 35 U.S.C. 154(b) by 247 days.

(21) Appl. No.: 16/525,751

(22) Filed: Jul. 30, 2019

(65) Prior Publication Data

US 2020/0035128 A1 Jan. 30, 2020

Related U.S. Application Data

(60) Provisional application No. 62/711,809, filed on Jul. 30, 2018.

(51) Int. Cl.
*G09B 23/30* (2006.01)
*B33Y 50/02* (2015.01)
(Continued)

(52) U.S. Cl.
CPC ............ *G09B 23/30* (2013.01); *B29C 64/393* (2017.08); *B29C 65/48* (2013.01);
(Continued)

(58) Field of Classification Search
CPC ........ G09B 23/30; B33Y 50/02; B33Y 80/00; B29C 65/48; B29C 66/7486; B29C 64/393; B29L 2031/40
See application file for complete search history.

(56) References Cited

U.S. PATENT DOCUMENTS

| 4,559,189 A | 12/1985 | Wegener, II |
| 4,596,528 A | 6/1986 | Lewis et al. |

(Continued)

FOREIGN PATENT DOCUMENTS

| EP | 1168278 A1 | 2/2002 |
| WO | 199721097 | 6/1997 |

(Continued)

OTHER PUBLICATIONS

John C. Charkoudian, A Model Skin Surface for Testing Adhesion to Skin, J. Soc. Cosmet. Chem., 39, 225-234; Jul./Aug. 1988.
(Continued)

*Primary Examiner* — Jason L Vaughan
*Assistant Examiner* — Amanda Kreiling
(74) *Attorney, Agent, or Firm* — Dinsmore & Shohl LLP

(57) ABSTRACT

Instructional dermatology surface models (IDSMs) useful as educational tools are provided herein, including a three-dimensional base rendered from at least one reference image of a skin lesion and a two-dimensional image layer rendered from the at least one reference image of the skin lesion disposed on a top surface of the three-dimensional base. Also provided are methods of manufacture, assembly, and use of the disclosed IDSMs, together with educational kits including a selection of IDSMs for simulating a variety of skin lesions.

20 Claims, 6 Drawing Sheets
(4 of 6 Drawing Sheet(s) Filed in Color)

(51) Int. Cl.
  *B33Y 80/00*    (2015.01)
  *B29C 65/48*    (2006.01)
  *B29C 65/00*    (2006.01)
  *B29C 64/393*   (2017.01)
  *B29L 31/40*    (2006.01)

(52) U.S. Cl.
  CPC .......... *B29C 66/7486* (2013.01); *B33Y 50/02* (2014.12); *B33Y 80/00* (2014.12); *B29L 2031/40* (2013.01)

(56) References Cited

U.S. PATENT DOCUMENTS

| | | | |
|---|---|---|---|
| 7,419,376 B2 | 9/2008 | Sarvazyan et al. | |
| 10,137,602 B2 * | 11/2018 | Jackson | B29C 39/02 |
| 2010/0189313 A1 * | 7/2010 | Prokoski | G01K 13/20 |
| | | | 382/118 |

FOREIGN PATENT DOCUMENTS

| | | |
|---|---|---|
| WO | 2010114947 A1 | 10/2010 |
| WO | 2013029081 A1 | 3/2013 |

OTHER PUBLICATIONS

Amit Garg et al, Modern Moulage: Evaluating the Use of 3-Dimensional Prosthetic Mimics in a Dermatology Teaching Program for Second-Year Medical Students; Arch Dermatol, vol. 146, No. 2, Feb. 2010.

Gerry Gormley et al, "Temporary tattoos: a novel OSCE assessment tool"; The Clinical Teacher, 2013; 10: 251-257.

Abstract of RG Langley et al, "Temporary tattoos to simulate skin disease: report and validation of a novel teaching tool"; Acad Med. Jul. 2009; 84(7): 950-953.

Caitlin A. Macgregor et al, "Melanoma Trainer Using Simulated Back Skin"; Simulation in Healthcare: Journal of the Society for Simulation in Healthcare, Jun. 2012.

Michael P. Chae et al, "3-D Printed haptic "Reverse" models for preoperative planning in soft tissue reconstruction: a case report"; Microsurgery, vol. 7, No. 4, Jul. 2014, 251-4.

Vivian Lee et al, "Design and Fabrication of Human Skin by Three-Dimensional Bioprinting"; Tissue Engineering: Part C, vol. 20, No. 6, 2014.

Steven R. Taylor and C.W. David Chang, "Gelatin Facial Skin Simulator for Cutaneous Reconstruction"; Annual AAO-HNS Meeting, Dallas, TX, 2015.

Xiaojie Wang et al., Skin Simulators for Dermatological Procedures; Dermatology Online Journal, 21 (11), 2015.

* cited by examiner

INSTRUCTIONAL DERMATOLOGY SURFACE MODELS AND METHODS OF USE

CROSS-REFERENCE TO RELATED APPLICATIONS

This application claims the benefit of U.S. Provisional Application Ser. No. 62/711,809, filed Jul. 30, 2018, the entirety of which is incorporated herein by reference.

TECHNICAL FIELD

This disclosure relates to instructional dermatology surface models and their use in simulating skin lesions or conditions for clinical diagnostic training.

BACKGROUND

Medical diagnosis is an uncertain art that depends largely on the skill and experience of the practitioner. Dermatological diagnoses tend to be based on either casual techniques, such as visual observation, or invasive techniques, such as biopsies. The need for improved dermatology education is evidenced by the high rates of skin disease and the morbidity (illness) and mortality (death) associated therewith. Many clinicians lack skills in basic dermatologic science, dermatopathy, and identification of skin lesions, rashes, and disorders. Barriers to education relate to inadequate training in skin assessment and inconsistent dermatology clinical experiences. While there are currently many educational resources that include photographs of skin lesions, rashes, and dermatological disorders, these photographs are generally exhibited in two-dimensional books, charts, presentations, websites, or posters for educational purposes. As such, the currently available tools fail to capture and present to the learner or clinician the breadth of differential diagnosis of lesions, rashes, and dermatological disorders, including location on body, color, texture, shape, and distribution.

A need exists for improved educational tools and methods of use for providing recognition, analysis, differentiation, and diagnosis of skin lesions, rashes, and dermatological conditions. Such improved educational tools can be applied to assist medical professionals (including healthcare students and licensed clinicians) within a classroom, simulation lab, and/or clinical setting, educate the public and non-medical professionals (massage therapists, hair stylists, etc.), and reduce health care costs by improving accurate recognition, assessment, and diagnosis.

SUMMARY

Accordingly, the presently-disclosed subject matter is directed to two- and three-dimensional realistic simulated skin lesions, which can be affixed to an instructional surface to provide a tool for improved clinical disease education.

In one embodiment, an instructional dermatology surface model (IDSM) is provided, comprising: a three-dimensional (3D) base rendered from at least one reference image of a skin lesion, the 3D base comprising a top surface and a bottom surface; and a two-dimensional (2D) image layer rendered from the at least one reference image of the skin lesion, wherein the 2D image layer is disposed on the top surface of the 3D base.

In another embodiment, a method of constructing an instructional dermatology surface model (IDSM) is provided, comprising: printing a 3D base rendered from at least one reference image of a skin lesion, wherein the 3D base comprises a top surface and a bottom surface; printing a 2D image layer rendered from the at least one reference image of the skin lesion; orienting the 2D image layer with the top surface of the 3D base; and affixing the 2D image layer to the top surface of the 3D printed base.

In another embodiment, a method of using an instructional dermatology surface model (IDSM) is provided, comprising: providing a 3D base rendered via 3D printing from at least one reference image of a skin lesion, wherein the 3D base comprises a textured top surface and a substantially planar bottom surface; adhering the bottom surface of the 3D base to an instructional surface; providing a 2D image layer rendered from the at least one reference image of the skin lesion; orienting the 2D image layer with the top surface of the 3D base; and affixing the 2D image layer to the top surface of the 3D printed base.

In another embodiment, a kit for simulating at least one skin lesion is provided, the kit comprising: at least one 3D base; at least one 2D image layer selected to correspond to the 3D base; and optionally a skin-safe adhesive; wherein the 3D base and the 2D image are configured to be joined together to provide an instructional dermatology surface model (IDSM) for simulating the at least one skin lesion.

These and other objects, features, embodiments, and advantages will become apparent to those of ordinary skill in the art from a reading of the following detailed description and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
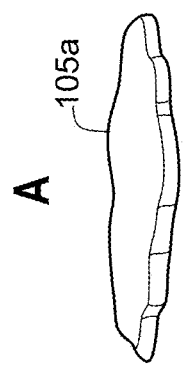
FIG. 1 is a perspective view showing the progression of a 3D base CAD model from preliminary to high-resolution format. (A) shows a preliminary 3D base model, which substantially corresponds to at least one reference image of a skin lesion at least with respect to perimeter. (B) shows a 3D base model with basic CAD sculpting to add top surface details. (C) shows a 3D base model with intermediate CAD sculpting to add further top surface details. (D) shows a high-resolution 3D base model with advanced CAD sculpting to add further top surface details that substantially correspond with the at least one reference image of the skin lesion.
Figure 1:
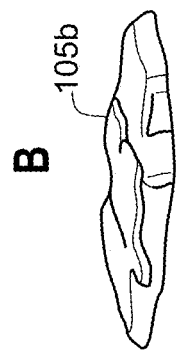
Figure 1:
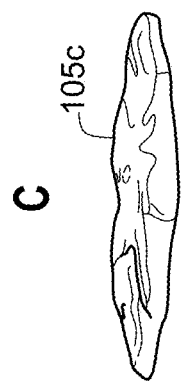
Figure 1:
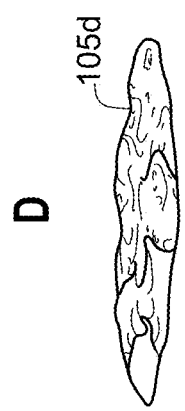

The details of one or more embodiments of the presently-disclosed subject matter are set forth in this document. Modifications to embodiments described in this document, and other embodiments, will be evident to those of ordinary skill in the art after a study of the information provided herein.

While the following terms are believed to be well understood by one of ordinary skill in the art, definitions are set forth to facilitate explanation of the presently-disclosed subject matter.

Unless defined otherwise, all technical and scientific terms used herein have the same meaning as commonly understood by one of ordinary skill in the art to which the presently-disclosed subject matter belongs.

Unless otherwise indicated, all numbers expressing quantities, measurements, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, size, or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed embodiments.

As used herein, "substantially planar" refers to a surface that is generally flat. With respect to the bottom surface of a 3D or 2D IDSM, the term "substantially planar" means that the surface is generally flat. In embodiments, the substantially planar IDSM surface lies generally flat against an instructional surface, such as a human skin surface or a mannequin surface. In embodiments, the substantially planar surface flexibly conforms to an instructional surface.

The instant disclosure is directed to realistic 2D and 3D instructional dermatology surface models (IDSMs) that are rendered from reference images of actual skin lesions. Also provided are methods of constructing and utilizing the same.

As used herein, the term "skin lesion" refers to an abnormal lump, bump, ulcer, sore, or colored area on the skin. Primary skin lesions include macules, patches, papules, plaques, wheals, nodules, vesicles, bulla, pustules, and cysts. Such primary skin lesions may further consist of secondary skin lesions including, but not limited to, alopecia, scales, crusts, follicular casts, comedones, pigmentation disorders, hyperkeratosis, collarette, scars, excoriations, erosions, ulcers, fissures, lichenifications, and calluses. Exemplary skin lesions include, but are not limited to, moles, acne vulgaris, alopecia, animal and human bites, bullous pemphigoid, burns, corns, calluses, dermatitis medicamentosa, dry skin, cold sores, blisters, hives, rashes, actinic keratosis, rosacea, carbuncles, boils, eczema, psoriasis, cellulitis, atopic dermatitis, seborrheic dermatitis, urticaria, warts, wounds, keratosis pilaris, hidradenitis suppurativa, nail disorders, pigmentation disorders, purpura, scabies, skin cancers, and lesions from a wide variety infectious diseases such as viral exanthems, impetigo, intertrigo, cutaneous MRSA, molluscum, chicken pox, measles, herpes zoster, ringworm, herpes simplex virus I and II, human papilloma virus (HPV), fungal infections, and the like. Additionally, skin lesions include systemic diseases that have skin symptomology, such meningitis, Lyme disease, rocky mountain spotted fever, vasculitis, and the like. The skilled artisan will appreciate that any cutaneous presentation of skin lesion or trauma can be realistically simulated via the disclosed IDSMs. Suitable skin lesions for simulation using the disclosed IDSMs and methods are found, for example, in Thomas P. Habif, *Clinical Dermatology: A Color Guide to Diagnosis and Therapy* ($6^{th}$ ed. 2015).

In a specific embodiment, the IDSMs simulate a lesion associated with a form of skin cancer. The three primary types of skin cancer include basal cell carcinoma (BCC), squamous cell carcinoma (SCC), and melanoma, each of which comprises various subtypes and variants. Melanoma subtypes include, for example, superficial spreading melanoma, lentigo melanoma, acral lentiginous melanoma, amelanotic, desmoplastic, and nodular melanoma. The IDSMs described herein are suitable for simulating any 2D or 3D skin lesion or condition.

In aspects, the presently-disclosed subject matter is directed to novel educational tools, or IDSMs, that comprise two-dimensional (2D) images rendered from photographs of actual skin lesions. In embodiments, the 2D image is imprinted, transferred, and/or embedded on a three-dimensional (3D) base. These IDSMs realistically simulate skin lesions on diverse instructional surfaces, such as human or animal skin surfaces or mannequin surfaces, regardless of size, age, or skin complexion. The IDSMs realistically simulate a variety of skin diseases and presentations to enhance the educational experience of the learner or clinician. The IDSMs simulate basic skin lesions, rashes, traumas, and diseases for the novice learner and complex lesions, rashes, traumas, and extensive dermatological disease for advanced practitioners.

Given a realistic visual simulation placed at the appropriate anatomical location, of specific skin lesions, the student and/or clinician will be trained to accurately identify and diagnose the skin lesion, as demonstrated verbally or in writing. Further, as there are numerous skin lesions and rashes (many which are similar in visual presentation), the student and/or clinician is able to simultaneously analyze different lesions located on the appropriate locations on the models' skin surfaces and compare the IDSMs to develop differential diagnoses, including accurate diagnoses as demonstrated verbally or in writing. Additionally, as many non-dermatological diseases have cutaneous presentations, the IDSMs offer expansive education related to cutaneous symptomology of numerous diseases. IDSMs further afford representation of cutaneous disease progression and/or regression. Three-dimensional IDSMs are useful for providing a tactile experience to the user, thereby enhancing educational value.

Utilizing high resolution photographs of skin lesions provides the learner the benefit of comparing diseases and acquiring recognition and differentiation skills related to the characteristics of common and uncommon skin lesions that affect patients of all ages and complexion. The disclosed IDSMs are configured for application to a skin surface of any patient or mannequin, thereby providing educational experiences across the spectrum of skin complexion and patient age.

IDSMs

In embodiments, the presently-disclosed subject matter is directed to realistic IDSMs comprising a three-dimensional (3D) base rendered from at least one reference image of a skin lesion, the 3D base comprising a top surface and a bottom surface; and a two-dimensional (2D) image layer rendered from the at least one reference image of the skin lesion, wherein the 2D image layer is disposed on the top surface of the 3D base. In embodiments, the 3D base comprises a textured top surface and a substantially planar bottom surface.

In embodiments, the 3D base is rendered using computer-aided design (CAD) software modeling packages and 3D printing technology. Suitable CAD packages are known in the art, including but not limited to 3DS Max (Autodesk, San Rafael, Calif.), Autodesk Maya (Autodesk, San Rafael, Calif.), Autodesk Fusion 360 (Autodesk, San Rafael, Calif.), Autodesk Autocad (Autodesk, San Rafael, Calif.), Rhino (Robert McNeel & Associates, Seattle, Wash.), Blender (Blender Foundation, Amsterdam, Netherlands), Modo (Foundry, London, UK), Cinema4D (Maxon Computer, Friedrichsdorf, Germany), SketchUp (Trimble, Sunnyvale, Calif.), and the like. The CAD software is used to create a preliminary 3D base CAD model from at least one reference image. In embodiments, the preliminary 3D base CAD model is created from a plurality of high-resolution reference images (i.e., 2, 3, 4, or more high-resolution reference images). As used herein, "high-resolution" refers to an image having a pixel count of at least about three hundred (300) pixels per inch (ppi). In embodiments, camera-projection is used to align at least one 2D reference image with the viewpoint of the camera in the CAD software to accurately render the 3D preliminary base CAD model. In embodiments, the preliminary 3D base CAD model is a low-resolution mesh 3D CAD model comprising a substantially accurate rendering of at least the perimeter of the skin lesion to be simulated.

The preliminary 3D base CAD model is then modified to add additional top surface details corresponding to the reference skin lesion to be simulated. In embodiments, the preliminary 3D base CAD model is further modified using a suitable sculpting software modeling package that enables custom sculpting of the base model. Suitable software packages comprising sculpting tools are known in the art, including but not limited to Zbrush (Pixologic, Los Angeles, Calif.), Autodesk Mudbox (Autodesk, San Rafael, Calif.), Sculptris (Pixologic, Los Angeles, Calif.), 3D-Coat (Pilgway, Kiev, Ukraine), and the like Autodesk Mudbox (Autodesk, San Rafael, Calif.), Sculptris (Pixologic, Los Angeles, Calif.), 3D-Coat (Pilgway, Kiev, Ukraine), and the like. In some embodiments, using the sculpting software, the preliminary 3D base CAD model of about 300 vertices is scaled up to about 15 million vertices. Additional surface details that correspond to the reference skin lesion are added by custom digital sculpting, optionally in stages. In embodiments, additional top surface details are added to the model using camera projection and/or CAD software tools available to one of skill in the art. The resulting model is a high-resolution 3D base CAD model.

The high-resolution 3D base CAD model is then inspected to detect any modeling artifacts, including but not limited to holes, pinches, spikes, or the like, which may have been inadvertently created during the CAD modeling steps. Any such artifacts are corrected using appropriate software tools to provide a high-resolution 3D base CAD model simulation of the reference skin lesion, suitable for production.

Figure 2:
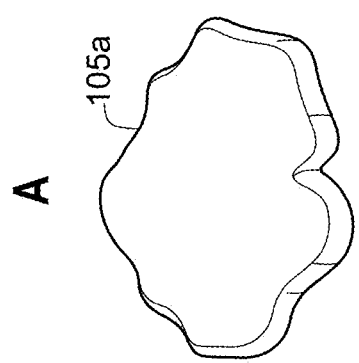
FIG. 2 is a top view showing the progression of a 3D base model from preliminary to high-resolution format. (A) shows a preliminary 3D base model, which substantially corresponds to at least one reference image of a skin lesion at least with respect to perimeter. (B) shows a 3D base model with basic CAD sculpting to add top surface details. (C) shows a 3D base model with intermediate CAD sculpting to add further top surface details. (D) shows a high-resolution 3D base model with advanced CAD sculpting to add further top surface details that substantially correspond with the at least one reference image of the skin lesion.
Figure 2:
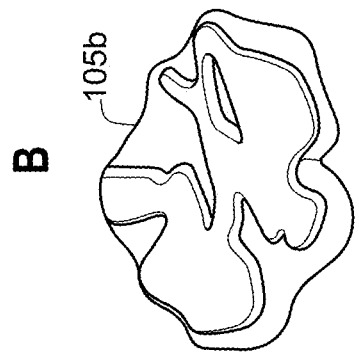
Figure 2:
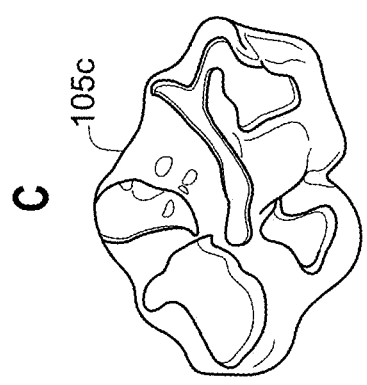
Figure 2:
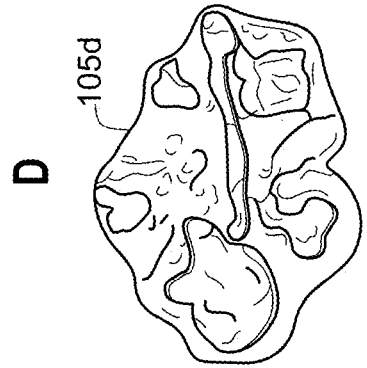

FIG. 1 and FIG. 2 depict progression of the 3D base CAD model 105 from a preliminary base model 105a (FIGS. 1(A) and 2(A)) to a high-resolution 3D base model 105d (FIGS. 1(D) and 2(D)). FIGS. 1(B)-(C) and 2(B)-(C) demonstrate basic and intermediate stages of CAD sculpting 105b and 105c, respectively, wherein additional surface details are progressively added to the 3D base model via software sculpting tools.

In embodiments, the 3D base model is used to manufacture a 3D base via 3D printing technology. Various suitable 3D printers are known in the art, including but not limited to, Form 2 Stereolithography (SLA) Resin printer (FormLabs, Somerville, Mass.), Form 3 Low Force Stereolithography (LFS) 3D printer (FormLabs, Somerville, Mass.), Moai 130 and 200 (Peopoly, Los Angeles, Calif.), Photon (Aycubic, Shenzhen, China), SparkMaker (SparkMaker, Hong Kong, China), Duplicator 7 (Wanhao, Jinhua, Zhejiang, China), Mini Deluxe (Monoprice, Brea, Calif.), Hunter (Flashforge USA, City of Industry, Calif.), Slash Plus (Uniz Technology LLC, San Diego, Calif.), Nobel 1.0 (XYZprinting, New Taipei City, Taiwan), Pico 2 (Asiga, Sydney, Australia) Liquid Crystal (Photocentric Group, Peterborough, UK), and the like. In embodiments, additive printing technology builds the 3D base layer by layer, using a polymer resin, wherein each layer comprises a height of approximately 25 microns. In embodiments, layers are cured by photopolymerization. Once complete, the printed 3D base is optionally washed in isopropyl alcohol to remove any uncured resin. Additional curing is performed as necessary and any support structures are trimmed and defects resulting therefrom are smoothed as needed. The finished 3D base may then be joined to a prepared 2D image layer.

The 3D base can also be produced by methods other than 3D printing. In another embodiment, a stencil is provided to suggest the location of building up an underlying substrate to create a 3D base. In one embodiment, liquid latex is built up in layers to produce a 3D base, configured to receive the transfer image unit. In another embodiment, a mold is used to create a 3D base that corresponds to the 3D structure of the particular skin lesion of interest, configured to receive the 2D image layer.

The 3D base can be manufactured from a variety of materials, including but not limited to, latex, polymers, thermoplastics, and/or thermosets. In aspects, thermoplastics can comprise polyvinyl chloride (PVC), polyester (PET), co-polyesters, such as polyethylene terephthalate (PETG), amorphous polyethylene terephthalate (APET), poly-cyclohexylenedimethylene terephthalate glycol (PCTG), polychloro terephthalate acetate copolyester (PCTA), pentaerythritol tetraacrylate (PETA), polycarbonate (PC), acrylic (PMMA), acrylonitrile butadiene styrene (ABS), transparent ABS (TABS), styrene acrylonitrile (SAN), styrene-butadiene styrene (SBS), styrene-butadiene copolymer (SBC), thermoplastic ionomers (e.g., surylin), and combinations thereof. In aspects, PMMA can comprise homopolymers, modified homopolymers, copolymers, block and/or grafted copolymers, and/or blends and alloys thereof. In aspects, thermosets can comprise polyesters, thermosetting acrylics, phenolics, polyurethane (PUR), and various combinations thereof. In a specific embodiment, the 3D base is 3D printed using a polymer resin. In a more specific embodiment, the resin is any polymer resin having a durometer/shore hardness of at least about 80. In a very specific embodiment, the resin is Formlabs Flexible Resin FLGRO2 (FormLabs, Somerville, Mass.).

In embodiments, the 3D base is rendered via 3D printing and corresponds to the at least one reference image of the skin lesion in one or more parameters selected from the group consisting of perimeter, shape, size, contour, texture, and combinations thereof.

In embodiments, the printed 3D base is substantially flexible, such that the bottom surface of the 3D base can flexibly conform to an instructional surface, such as human skin or a mannequin surface.

In embodiments, the bottom surface of the 3D base further comprises an adhesive for removably affixing the 3D base to an instructional surface. In other embodiments, an adhesive is applied to the instructional surface prior to affixing the 3D base.

The 2D image layer is rendered from at least one reference image of the skin lesion to be simulated. In embodiments, a reference image of the skin lesion to be simulated is manipulated and/or edited using photo editing software to remove background features in the image other than the skin lesion of interest. Standard photo editing software is suitable for use, including but not limited to Adobe Photoshop (Adobe, Inc., San Jose, Calif.). The reference image may be edited to adjust the size of the image to reflect the particular skin lesion or condition targeted for simulation, to remove skin pixels surrounding the lesion of interest, or to adjust contrast, clarity, and/or coloring, etc. In embodiments, a feathering technique is employed to blend the perimeter of the skin lesion of interest with surrounding skin in the image. The resulting edited 2D image is suitable for preparing the 2D image layer.

In embodiments, the 2D image is printed on a substrate suitable for affixing the image to the 3D base. In a specific embodiment, the 2D image is printed on transfer media. Transfer media substrates are known in the art and comprise water permeable paper coated with a water soluble natural or synthetic polymer, such as dextrin. Suitable transfer media substrates are set forth, for example, in U.S. Pat. No. 4,337,289, incorporated herein by reference in its entirety.

In another embodiment, the 2D image is printed on a substrate comprising an adhesive backing, such that the 2D image layer can be peeled from the backing and directly applied to the 3D base.

Once the edited 2D image is printed on the transfer media, the media is trimmed about the perimeter of the lesion. In embodiments, a border around the perimeter of the lesion image is included, which border will at least partially extend beyond the perimeter of the underlying 3D base and contact the instructional surface.

To assemble the IDSM, the 2D image layer is aligned or oriented with the 3D base. In certain embodiments, a stencil is provided to guide the practitioner in orienting the 2D image layer with the 3D base, as the image may be obscured by the backing film of the transfer media. The dry 3D base is dampened with water to prepare the top surface to receive the 2D image layer. Protective film, if present, is removed from the transfer media comprising the printed 2D image. The 2D image is oriented with the 3D base and affixed to the top surface thereof. A damp towel or sponge is applied to the backing film of transfer media to release the 2D image layer from the backing paper and affix the 2D image layer to the 3D base. Light pressure may be applied to smooth the 2D image layer over the textured 3D base, rubbing down any loose edges and assuring that all edges are adhered to the 3D base and/or underlying instructional surface.

In another embodiment, the 2D image can be imprinted or embedded directly on the surface of a corresponding 3D base.

In embodiments, the 3D base is affixed to an instructional surface, such as human skin or a mannequin surface, prior to affixing the 2D image layer over the 3D base. In other embodiments, the 2D image layer is affixed to the 3D base to provide an assembled IDSM prior to affixing the assembled IDSM to the instructional surface.

The IDSMs disclosed herein are removably affixed to an instructional surface, using adhesives suitable for removably affixing to skin or mannequin surfaces. Such adhesives are well known in the art and include, for example, water-activated adhesives for application to skin or mannequin surfaces, spirit gum, liquid latex, and the like.

In another embodiment, the 3D base is placed on the instructional surface without the use of an adhesive and the 2D image layer comprises a border that extends beyond the perimeter of the underlying 3D base which, once in contact with the instructional surface, affixes the IDSM to the instructional surface without the use of additional adhesive.

In aspects, the IDSMs can be placed on the skin surface of a human or mannequin model. The IDSMs disclosed herein are suitable for use on any skin color, tone, or age and on models of any age, including newborn, pediatric, or geriatric models. The IDSMs disclosed herein will vary in size, depending on the lesion to be simulated and the skin surface or anatomical location where the IDSM will be applied. For example, the viral lesions of herpes zoster follow a specific dermatome (an area of the skin supplied by nerves from a single spinal root) on the skins surface. IDSM educational tools would model this dermatome distribution to capture and represent an accurate nature of presentation of these skin lesions. The IDSMs will also offer practical use in the simulation lab on the model simulators. Any age, size, or skin color mannequin can be used in education related to the specific dermatological condition. For example, the pediatric simulator skin surfaces would be appropriate for the five viral exanthems (rashes) tools. The body surface areas would be covered as appropriate depicting the actual surface area, lesions, and characteristics of the specific dermatological condition. It is noted that many non-dermatological diseases present with characteristic skin rashes and lesions which translates into far reaching educational scenarios and IDSM applications.

Figure 3:
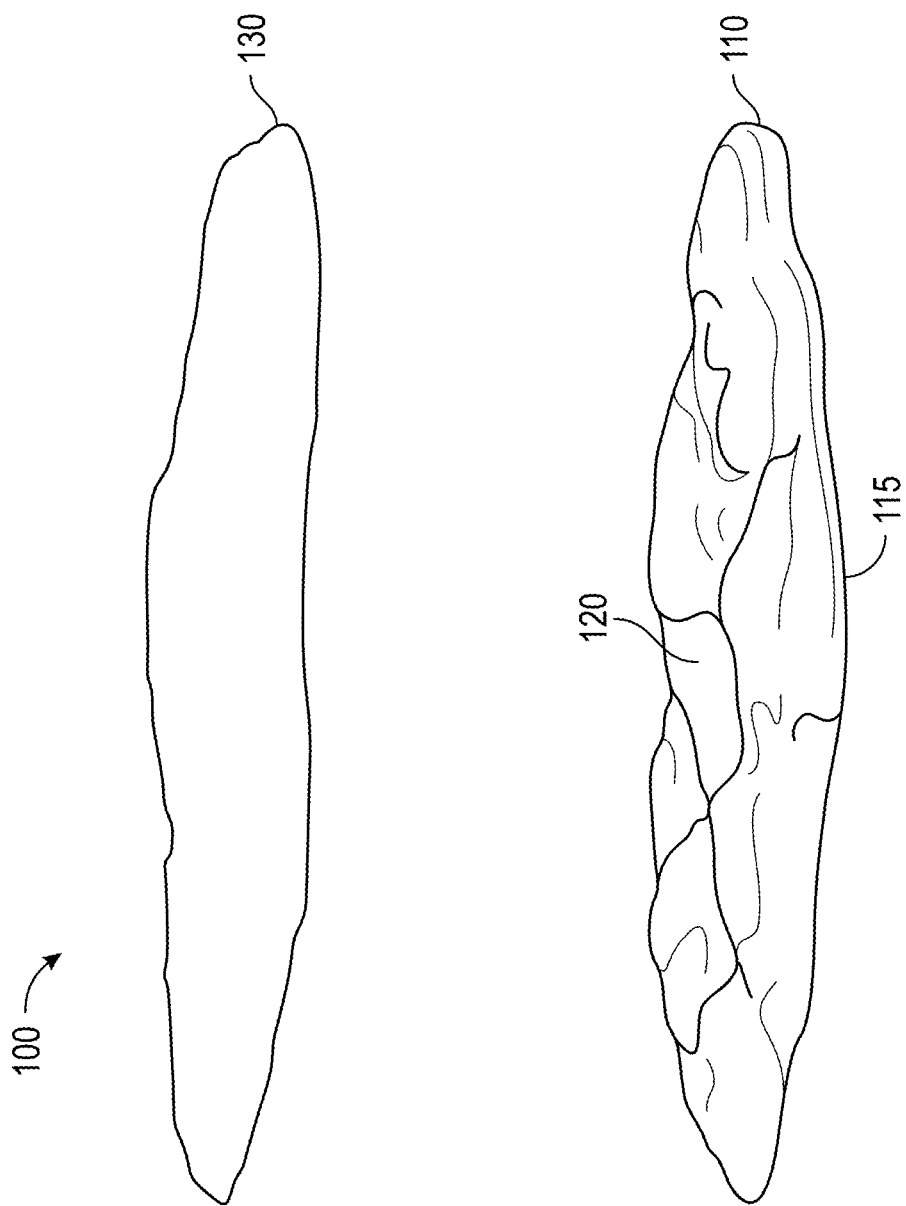
FIG. 3 is an exploded view of an exemplary embodiment of a 3D IDSM as disclosed herein.

FIG. 3 is an exploded perspective view of an exemplary embodiment of an IDSM 100, comprising a 3D base 110 having a substantially planar bottom surface 115 and a top surface 120; and a 2D image layer 130. The skilled artisan will appreciate that the IDSM can comprise any shape or texture suitable for simulating a skin lesion or other dermatological condition. In embodiments, the 2D image layer 130 is affixed to the top surface 120 of the 3D base 110. The 3D base 110 can be affixed to an instructional surface, such as human skin or a mannequin surface, either before or after affixing the 2D image layer 130 to the 3D base 110.

In embodiments, the 2D image layer 130 can be applied directly to an instructional surface, without the use of an underlying 3D base (not shown).

Figure 4:
FIG. 4 is a series of photographs showing the steps of applying an exemplary IDSM to a mannequin surface. (A) shows placement of the 2D image layer disposed on transfer media over a 3D base; (B) shows moistening the backing film of the transfer media to transfer the 2D image layer to the 3D base; and (C) shows the fully assembled 3D IDSM.
Figure 4:
Figure 4:
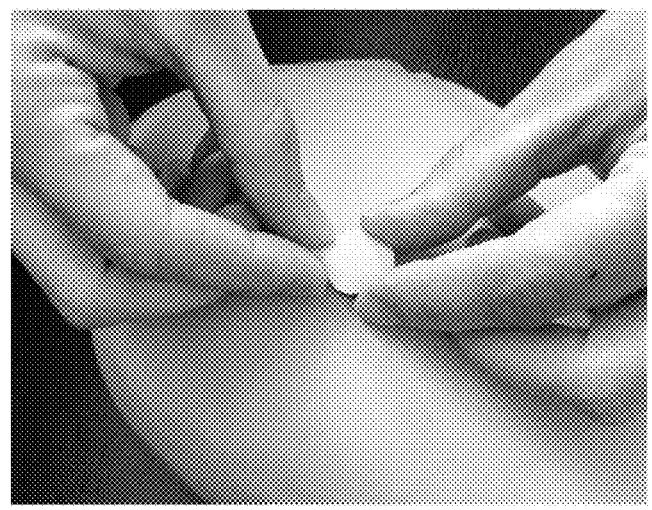

FIG. 4 is a series of photographs showing application of an exemplary IDSM to a mannequin surface. FIG. 4(A) demonstrates placement of the 2D image layer, which has been printed on transfer media, over a 3D base (obscured by the 2D image layer). In FIG. 4(B), the transfer media backing film is moistened to effect transfer of the 2D image layer to the 3D base. In FIG. 4(C), the transfer media backing film is removed to reveal the assembled IDSM.

Figure 5:
FIG. 5 is a series of photographs showing the IDSM in stages of application to a skin surface. (A) shows application of the 3D base to skin surface; (B) shows the assembled IDSM, having a 2D image layer disposed over the 3D base; and (C) shows removal of the IDSM from the skin surface after application/use.

FIG. 5 comprises a series of photographs demonstrating the IDSM in stages of application to a skin surface. FIG. 5(A) shows the 3D base located on the skin surface of a human model. FIG. 5(B) shows the assembled IDSM located on the skin surface, having a 2D image layer disposed over the 3D base. FIG. 5(C) demonstrates removal of the IDSM from the skin surface after application.

Figure 6:
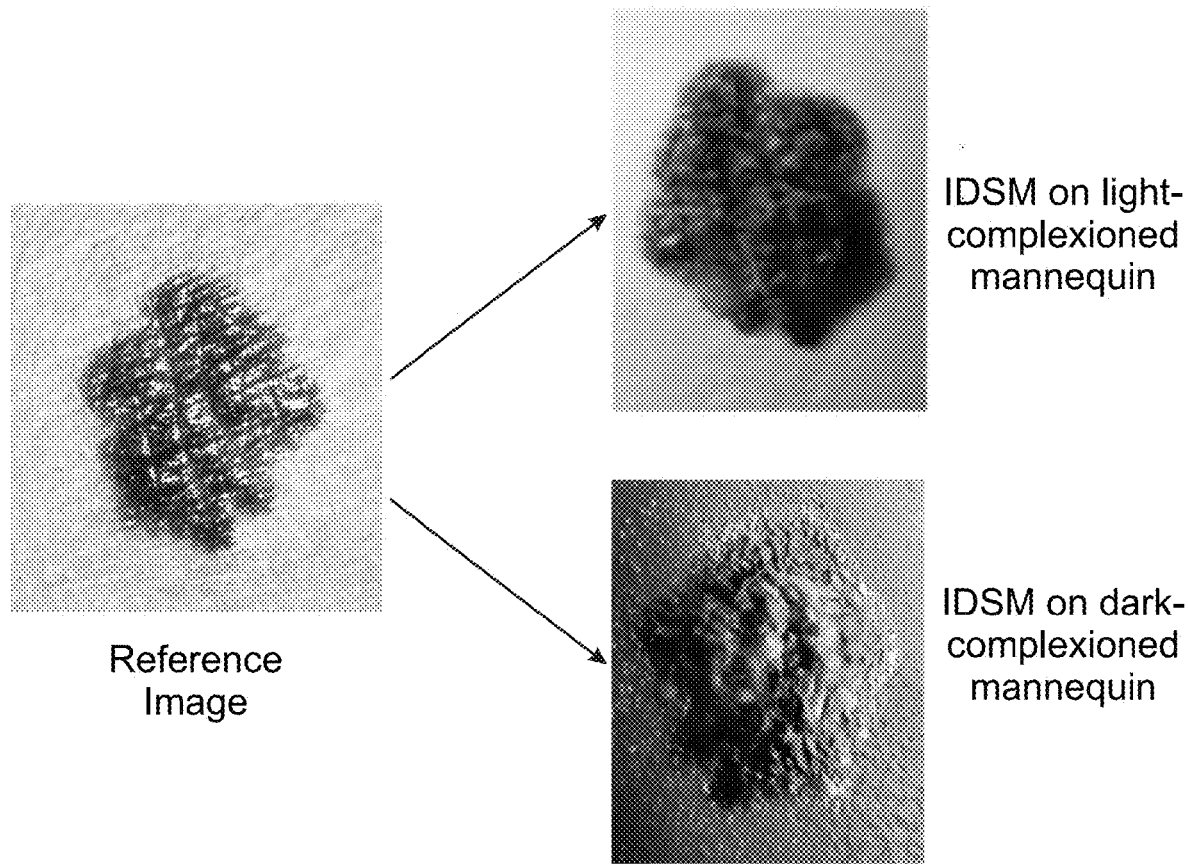
FIG. 6 is a series of photographs showing a reference image of a melanoma (left) and an exemplary IDSM modeled after the reference image, applied to each of a light-complexioned mannequin (top right) and a dark-complexioned mannequin (bottom right).

FIG. 6 comprises a series of photographs showing a reference image of a melanoma (left) and an exemplary IDSM modeled after the reference image, applied to each of a light-complexioned mannequin (top right) and a dark-complexioned mannequin (bottom right).

Figure 7:
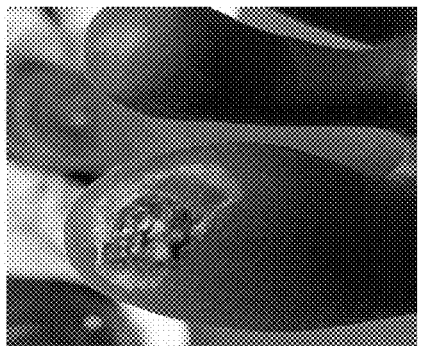
FIG. 7 is a series of photographs of exemplary realistic IDSMs, including: (A) an acral melanoma IDSM applied to a mannequin surface; (B) an acral melanoma IDSM applied to a mannequin surface, (C) a 2D acral melanoma IDSM applied to a mannequin surface; (D) a melanoma IDSM applied to a mannequin surface; (E) a basal cell carcinoma IDSM applied to a mannequin surface; (F) a basal cell carcinoma IDSM applied to a human skin surface; and (G) a squamous cell carcinoma IDSM applied to a mannequin surface.
Figure 7:
Figure 7:
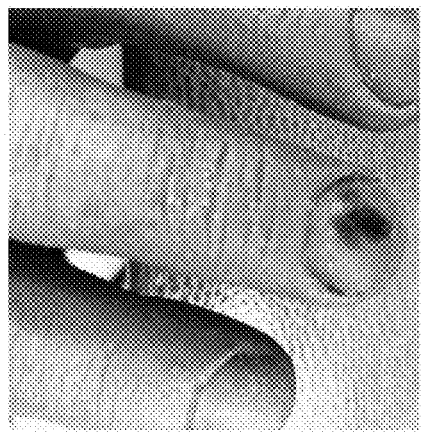
Figure 7:
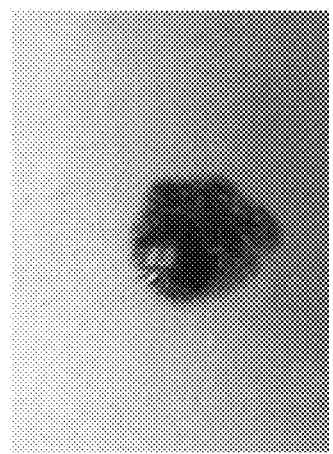
Figure 7:
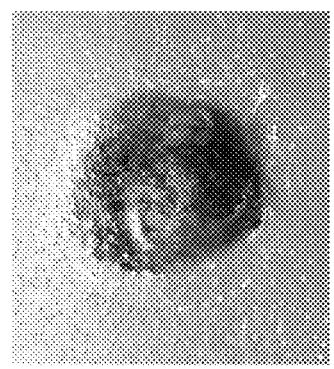
Figure 7:
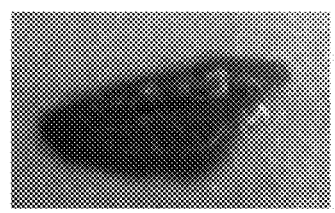
Figure 7:
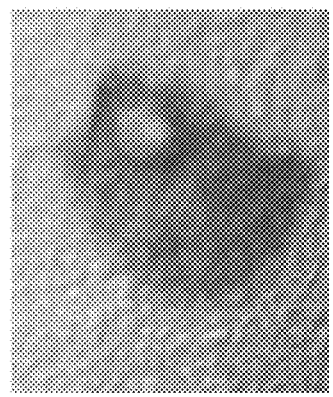

FIG. 7 comprises a series of photographs of exemplary realistic IDSMs, including: (A) an acral melanoma IDSM applied to a mannequin foot surface; (B) an acral melanoma IDSM applied to a mannequin foot surface, (C) a 2D acral melanoma IDSM applied to a mannequin fingernail surface; (D) a melanoma IDSM applied to a mannequin surface; (E) a basal cell carcinoma IDSM applied to a mannequin surface; (F) a basal cell carcinoma IDSM applied to a human skin surface; and (G) a squamous cell carcinoma IDSM applied to a mannequin surface.

The representation of high-resolution photographs of actual skin lesions, rashes and diseases within a tool that can be placed on the appropriate skin surface of a standardized patients or simulated models is ideal. For example and not by way of limitation, expressing the three most prevalent skin cancer types, basal cell carcinoma (BCC), squamous cell carcinoma (SCC) and melanoma, within these tools (either two or three-dimensionally) will allow multiple photographs of these cancers to be conveyed within and on the educational tools and then be placed on the most appropriate skin surfaces. Not only will the lesions be appropriately modeled anatomically, but the same types of lesions with varying degrees of morphology, size, and color variations can be placed on the skin surfaces and analyzed simultaneously.

Accordingly, a method of constructing an instructional dermatology surface model (IDSM) is provided herein, comprising: printing a 3D base rendered from at least one reference image of a skin lesion, wherein the 3D base comprises a top surface and a bottom surface; printing a 2D image layer rendered from the at least one reference image of the skin lesion; orienting the 2D image layer with the top surface of the 3D base; and affixing the 2D image layer to the top surface of the 3D printed base.

In embodiment, the 3D base corresponds to the at least one reference image of the skin lesion in one or more parameters selected from the group consisting of shape, size, contour, texture, and combinations thereof.

In embodiments, the 3D base comprises a textured top surface and a substantially planar bottom surface.

In embodiments, the skin lesion is selected from the group consisting of skin cancer, moles, acne, cold sores, blisters, hives, rashes, actinic keratosis, rosacea, carbuncles, boils, eczema, psoriasis, cellulitis, contact dermatitis, warts, keratosis pilaris, chicken pox, measles, and ringworm. In a specific embodiment, the skin cancer is selected from the group consisting of melanoma, basal cell carcinoma, and squamous cell carcinoma.

In embodiments, the at least one reference image is at least one high resolution photograph of a skin lesion.

In another embodiment, a method of using an instructional dermatology surface model (IDSM) is provided, comprising: providing a 3D base rendered via 3D printing from at least one reference image of a skin lesion, wherein the 3D base comprises a textured top surface and a substantially planar bottom surface; adhering the bottom surface of the 3D base to an instructional surface; providing a 2D image layer rendered from the at least one reference image of the skin lesion; orienting the 2D image layer with the top surface of the 3D base; and affixing the 2D image layer to the top surface of the 3D printed base.

In embodiments, the instructional surface is selected from the group consisting of a human skin surface and a mannequin surface.

In embodiments, the IDSM is removably adhered to the instructional surface. In embodiments, the 3D base is reusable.

Kits

Also provided herein are kits for use in simulating skin lesions for clinical education or other purposes. Kits comprise one or more 3D bases and one or more 2D image layers for use in assembling one or more IDSMs.

In embodiments, a kit comprises a plurality of different types of 3D bases and 2D image layers, in order to simulate a variety of different skin lesions. In one embodiment, a kit comprises at least one 3D base and at least one 2D image layer to assemble an IDSM for each of a selection of different skin cancers. For example, an exemplary kit may contain three different styles of 3D base, each corresponding to a common type of skin cancer (BCC, SCC, or melanoma), and three different styles of 2D image layer corresponding to the same types of skin cancer. The instantly disclosed kits can include materials for assembling any number of simulated skin lesions described herein (i.e., materials for assembling IDSMs to simulate 1, 2, 3, 4, 5, 6, 7, 8, 9, 10, or more different simulated skin lesions).

Optionally, the 2D image layers are provided in sheets, wherein each sheet comprises a plurality of discrete 2D images, each having a perforated border for conveniently separating the 2D image from the sheet for use.

In embodiments, the kits comprise one or more reusable 3D bases. Because the 3D bases can be reused, in embodiments the kits comprise additional sets of 2D image layers, such that the 3D bases can be removed, cleaned as needed, and reused with a new 2D image layer.

Kits optionally include a skin-safe adhesive for removably affixing the 3D base to an instructional surface and/or a cleaning solution or wipe for cleansing the instructional surface prior to application of the IDSM and/or cleansing the 3D base in preparation for reuse with a new 2D image layer. Such skin-safe adhesives, cleaning solutions, and cleaning wipes are generally known in the art.

In another embodiment, a kit for simulating at least one skin lesion is provided, the kit comprising: at least one 3D base; at least one 2D image layer selected to correspond to the 3D base; and optionally a skin-safe adhesive; wherein the 3D base and the 2D image are configured to be joined together to provide an instructional dermatology surface model (IDSM) for simulating the at least one skin lesion.

In further embodiments, the kits comprise instructions for use of the IDSMs, including instructions for assembly, removal, reuse of 3D bases, and/or educational materials for training clinicians in diagnosis of the represented skin lesions.

EXAMPLES

The following detailed methodology and materials are set forth to support and illustrate particular aspects and embodiments of the invention, and should not be construed as limiting the scope thereof.

Example 1—Melanoma IDSM Preparation

Multiple high resolution images of an actual melanoma skin lesion are used to generate a high resolution 3D base CAD model, using the 3DS Max software package (Autodesk, San Rafael, Calif.) and Zbrush (Pixologic, Los Angeles, Calif.). The 3D base CAD model is used to print the 3D base using a Form 2 Stereolithography (SLA) Resin printer (FormLabs, Somerville, Mass.). The 3D base is printed from Formlabs Flexible Resin FLGRO2 according to manufacturer's recommended processes.

A top-view high resolution image of the actual melanoma skin lesion is edited using Adobe Photoshop (Adobe, Inc., San Jose, Calif.) to remove background images outside the border of the melanoma, adjust the color and contrast of the image as needed, etc. The resulting 2D image is printed on transfer media using a standard inkjet printer.

Example 2—Melanoma IDSM Use in Simulation

IDSMs offer visual and/or tactile exposure and experience of lesions, standardizing the education for students and clinicians. IDSMs can be placed on models of various ages and skin complexions to promote diversity and comprehensive simulations enhancing diagnostic reasoning. The IDSMs are easy to use and require little time to apply and remove.

Given the high rate of melanoma misdiagnosis and the seriousness of the condition, IDSMs simulating melanoma are particularly useful for education and training purposes. Preparation of the Skin Surface and Applying the IDSM:

The area where the IDSM will be placed is cleaned with soap and water and allowed to dry. The 2D melanoma image is selected and separated from the sheet of images along perforated lines. A matching 3D base is selected for use.

The 3D base is placed, flat surface in contact with the skin, on the selected anatomical site for application. If needed, a small amount of liquid latex is used under the 3D base to secure the base in place. The clear plastic film is removed and discarded from the transfer media upon which the 2D image is printed. Holding the 2D melanoma model by the edges, the 2D model is aligned over the 3D base, with the image layer contacting the 3D base and the backing paper facing upward.

Moisture is applied to the backing paper to loosen the 2D image layer from the backing paper and transfer the 2D image layer to the surface of the 3D base. A damp cloth or sponge is used to saturate the backing paper. The backing paper is carefully removed and the melanoma IDSM is allowed to dry completely.

Optionally, the 2D image layer can be used without the underlying 3D base, by applying the 2D melanoma image directly to the instructional surface.
IDSM Use in Simulation:

A human test patient having a melanoma IDSM applied to the upper thigh is presented to a clinical student for mock examination and diagnosis. The clinical student examines the test patient and observes the IDSM, inspecting for both tactile and visual characteristics. The student diagnoses the test patient as having melanoma.

The references cited herein are incorporated by reference in their entirety. It will be appreciated by persons skilled in the art that the present invention is not limited to what has been particularly shown and described herein above.

Various modifications of the present invention, in addition to those shown and described herein, will be apparent to those skilled in the art of the above description. Such modifications are also intended to fall within the scope of the appended claims.

It is appreciated that all materials and reagents are obtainable by sources known in the art unless otherwise specified.

The foregoing description is illustrative of particular aspects of the invention, but is not meant to be a limitation upon the practice thereof.

What is claimed:

1. An instructional dermatology surface model (IDSM) comprising:
   a three-dimensional (3D) base rendered from at least one reference image of a skin lesion, the 3D base comprising a top surface and a bottom surface; and
   a two-dimensional (2D) image layer rendered from the at least one reference image of the skin lesion, wherein the 2D image layer is disposed on the top surface of the 3D base.

2. The IDSM of claim 1, wherein the 3D base is rendered via 3D printing and corresponds to the at least one reference image of the skin lesion in one or more parameters selected from the group consisting of shape, size, contour, texture, and combinations thereof.

3. The IDSM of claim 1, wherein the 3D base comprises a textured top surface and a substantially planar bottom surface.

4. The IDSM of claim 1, wherein the skin lesion is selected from the group consisting of moles, acne vulgaris, alopecia, animal and human bites, bullous pemphigoid, burns, corns, calluses, dermatitis medicamentosa, dry skin, cold sores, blisters, hives, rashes, actinic keratosis, rosacea, carbuncles, boils, eczema, psoriasis, cellulitis, atopic dermatitis, seborrheic dermatitis, urticaria, warts, wounds, keratosis pilaris, hidradenitis suppurativa, nail disorders, pigmentation disorders, purpura, scabies, skin cancer, viral exanthems, impetigo, intertrigo, cutaneous MRSA, molluscum, chicken pox, measles, herpes zoster, ringworm, herpes simplex virus I and II, human papilloma virus (HPV), and fungal infections.

5. The IDSM of claim 4, wherein the skin cancer is selected from the group consisting of melanoma, basal cell carcinoma, and squamous cell carcinoma.

6. The IDSM of claim 1, wherein the at least one reference image is at least one high resolution photograph of a skin lesion.

7. The IDSM of claim 1, wherein the 2D image layer comprises an adhesive backing for affixing the 2D image layer to the 3D base.

8. A method of constructing an instructional dermatology surface model (IDSM), comprising:
   printing a 3D base rendered from at least one reference image of a skin lesion, wherein the 3D base comprises a top surface and a bottom surface;
   printing a 2D image layer rendered from the at least one reference image of the skin lesion;
   orienting the 2D image layer with the top surface of the 3D base; and affixing the 2D image layer to the top surface of the 3D base.

9. The method of claim 8, wherein the 3D base corresponds to the at least one reference image of the skin lesion in one or more parameters selected from the group consisting of shape, size, contour, texture, and combinations thereof.

10. The method of claim 8, wherein the 3D base comprises a textured top surface and a substantially planar bottom surface.

11. The method of claim 8, wherein the skin lesion is selected from the group consisting of moles, acne vulgaris, alopecia, animal and human bites, bullous pemphigoid, burns, corns, calluses, dermatitis medicamentosa, dry skin, cold sores, blisters, hives, rashes, actinic keratosis, rosacea, carbuncles, boils, eczema, psoriasis, cellulitis, atopic dermatitis, seborrheic dermatitis, urticaria, warts, wounds, keratosis pilaris, hidradenitis suppurativa, nail disorders, pigmentation disorders, purpura, scabies, skin cancer, viral exanthems, impetigo, intertrigo, cutaneous MRSA, molluscum, chicken pox, measles, herpes zoster, ringworm, herpes simplex virus I and II, human papilloma virus (HPV), and fungal infections.

12. The method of claim 11, wherein the skin cancer is selected from the group consisting of melanoma, basal cell carcinoma, and squamous cell carcinoma.

13. The method of claim 8, wherein the at least one reference image is at least one high resolution photograph of a skin lesion.

14. The method of claim 8, wherein the 2D image layer comprises an adhesive backing for affixing the 2D image layer to the 3D base.

15. A method of using an instructional dermatology surface model (IDSM), comprising:
   providing a 3D base rendered via 3D printing from at least one reference image of a skin lesion, wherein the 3D base comprises a textured top surface and a substantially planar bottom surface;
   adhering the bottom surface of the 3D base to an instructional surface;
   providing a 2D image layer rendered from the at least one reference image of the skin lesion;
   orienting the 2D image layer with the top surface of the 3D base; and
   affixing the 2D image layer to the top surface of the 3D base.

16. The method of claim 15, wherein the instructional surface is selected from the group consisting of a human skin surface and a mannequin surface.

17. The method of claim 15, wherein the IDSM is removably adhered to the instructional surface.

18. The method of claim 15, wherein the skin lesion is selected from the group consisting of moles, acne vulgaris, alopecia, animal and human bites, bullous pemphigoid, burns, corns, calluses, dermatitis medicamentosa, dry skin, cold sores, blisters, hives, rashes, actinic keratosis, rosacea, carbuncles, boils, eczema, psoriasis, cellulitis, atopic dermatitis, seborrheic dermatitis, urticaria, warts, wounds, keratosis pilaris, hidradenitis suppurativa, nail disorders, pigmentation disorders, purpura, scabies, skin cancer, viral exanthems, impetigo, intertrigo, cutaneous MRSA, molluscum, chicken pox, measles, herpes zoster, ringworm, herpes simplex virus I and II, human papilloma virus (HPV), and fungal infections.

19. The method of claim 18, wherein the skin cancer is selected from the group consisting of melanoma, basal cell carcinoma, and squamous cell carcinoma.

20. The method of claim 15, wherein the 3D base is reusable.

* * * * *